Feb. 2, 1960  L. JONES ET AL  2,923,567
QUICK DISCONNECT COUPLING
Filed Sept. 18, 1957
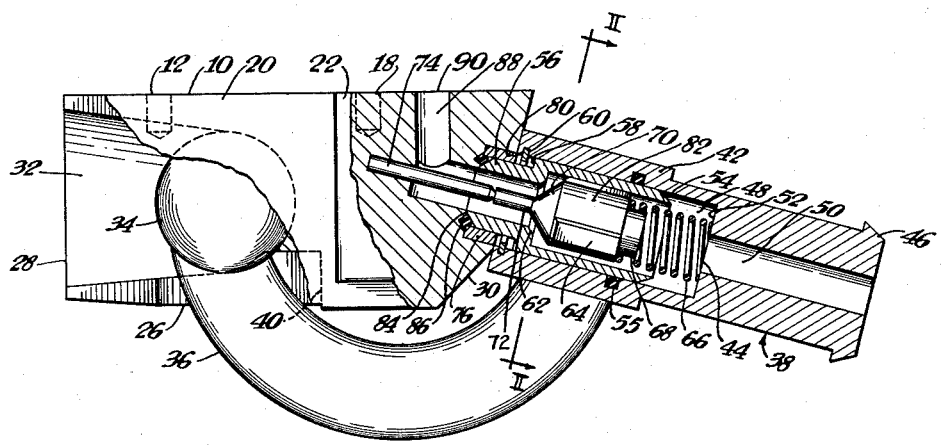
Fig. 1.
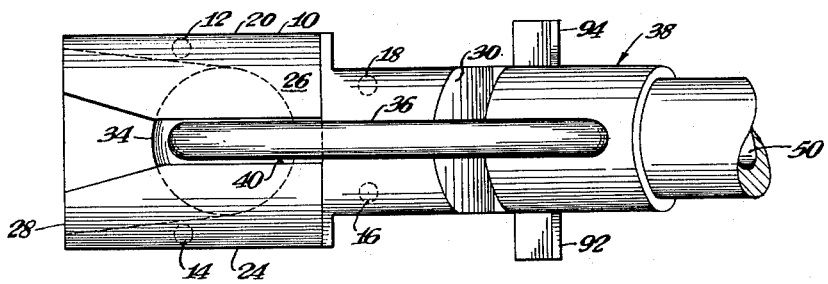
Fig. 3.
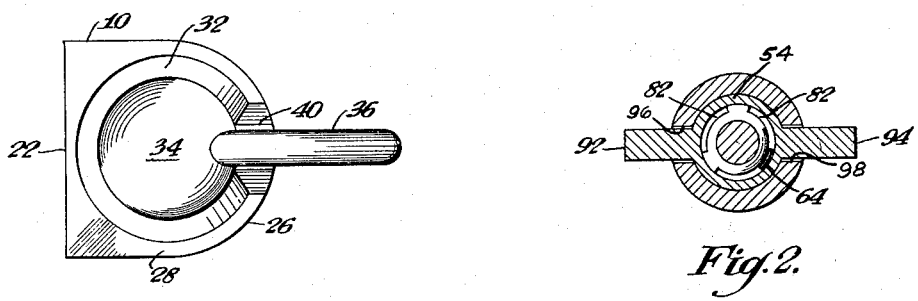
Fig. 4.
Fig. 2.
INVENTORS.
Leon Jones and
Donald H. Lawrence.
BY
ATTORNEY.

2,923,567

QUICK DISCONNECT COUPLING

Leon Jones, Garden Grove, and Donald H. Lawrence, Buena Park, Calif., assignors to Robertshaw-Fulton Controls Company, Richmond, Va., a corporation of Delaware Application September 18, 1957, Serial No. 684,680

6 Claims. (Cl. 287—87)

This invention relates to pneumatic hose couplings and more particularly to a quick disconnect hose coupling for use in connection with aviator's helmet mounted oxygen breathing systems.

In a conventional hose coupling, there is a multiplicity of manipulation requiring the use of both hands simultaneously to effect connection or disconnection of the hose coupling. Many times it is desirable to make a hose connection with one hand, as in the case of the connection or disconnection of an oxygen supply to a pilot's helmet, while leaving the other hand free to carry out various other operations.

Therefore, it is an object of this invention to quickly and easily connect or disconnect a pneumatic hose coupling while requiring minimum orientation of parts.

Another object of this invention is to permit fluid flow only after the connecting mechanism is properly engaged.

In the preferred embodiment of this invention, a ball member is attached to an arm of a disconnect member for insertion in a socket to align a disconnect passage with a socket passage. When the passages are aligned, a nozzle in the disconnect member is pressure biased into a seat in the socket completing the connection and a stationary probe in the socket engages a valve in the disconnect member to permit fluid flow.

Other objects and advantages of this invention will become apparent from the following detailed description taken in connection with the accompanying drawing wherein:

Fig. 1 is a side elevation view partly in section of the oxygen quick disconnect system;

Fig. 2 is a section taken on line II—II of Fig. 1;

Fig. 3 is a front elevation view; and

Fig. 4 is an end elevation.

Referring more particularly to the drawing, a socket 10 which is normally bolted at 12, 14, 16, and 18 to a pilot's helmet, face piece, or oxygen regulator (not shown) is provided with sides 20, 22, 24, semi-circular shaped side 26, and ends 28 and 30. A cavity 32 is provided in end 28 of socket 10 to receive a ball 34 which is attached by any suitable means, such as a weld, to a connecting arm 36 of a disconnect member indicated generally at 38. A slot 40 is formed in the side wall 26 of socket 10 to allow axial movement of the connecting arm 36 during engagement and disengagement of the ball 34 in socket member 10.

The disconnect member 38 comprises a casing 42 with a passage 44 extending axially therethrough for supplying oxygen from an external source, such as a tube or conduit (not shown), which may be connected to a flange 46. The passage 44 has a section 48 having a larger diameter than the section 50. The connection of sections 48 and 50 defines a shoulder 52 in the casing 42 which is adapted to limit the movement in one direction of a sleeve 54 which is slidable in the larger section 48. A sealing ring 55 is provided in the casing 42 to prevent leakage between the casing 42 and the sleeve 54. The sleeve 54 has a nozzle portion 56 formed integral therewith. The nozzle portion 56 has a smaller diameter than the sleeve 54 thereby forming an outer shoulder 58 which is adapted for engagement with a retaining ring 60 embedded in casing 42 to limit the movement of the sleeve 54 in the other direction and an inner seat 62 which is adapted to receive a poppet 64 to stop the flow of fluid to the casing 42.

A spring 66 is compressed between a centering piece 68 on the poppet 64 and the casing shoulder 52. The coil spring 66 normally biases the conical poppet face 70 against the seat 62. The conical poppet face 70 is provided with a cylindrical projection 72 which is adapted to engage a stationary probe 74 embedded in the socket 10 to unseat the poppet 64 when the nozzle 56 is received by a nozzle seat retainer 76 which is provided in passage opening 80 of socket end 30. The poppet 64 is provided with peripheral recesses 82 and fluid flow will pass therethrough when the poppet 64 is unseated. The beveled end 84 of nozzle 56 is adapted to engage a sealing ring 86 which is held in place by nozzle seat retainer 76 to prevent leakage therebetween when the poppet 64 is seated. A curved passage 88 is provided in socket 10 to connect the passage opening 80 with an opening 90 in the side wall 22.

It is now apparent that when the disconnect member 38 and socket 10 are engaged, there is a continuous passage for the fluid flow from the external source (not shown) through the disconnect member 38 and the socket 10 to the pilot's helmet or oxygen regulator (not shown).

In operation, the quick disconnect member 38 is positioned over the socket 10 and is pulled downwardly until the ball 34 seats in cavity 32. The disconnect member 38 is then rotated toward the helmet (not shown) depressing the nozzle 56 into section 48 of passage 44 against fluid pressure by sliding engagement with end surface 30.

When the nozzle 56 is in axial alignment with the nozzle seat retainer 76, the pressure behind the sleeve 54 forces the nozzle 56 into the nozzle seat retainer 76 and also forces the beveled end 84 of the nozzle 56 against the sealing ring 86 to provide a leakproof connection between the disconnect member 38 and the socket 10. Substantially simultaneously with the seating of the nozzle 56, the cylindrical projection 72 on the poppet face 70 engages the stationary probe 74 to unseat the poppet 64 permitting the flow of oxygen to the user.

To disconnect the quick disconnect member 38 from the socket 10, the user merely pulls down on ears 92 and 94 which are integrally formed with sleeve 54 and extend through elongated slots 96 and 98 respectively in the casing 42 causing the nozzle 56 to recede from the nozzle seat retainer 76. As the nozzle recedes, the inner seat 62 comes into contact with the poppet face 70 to shut off the oxygen flow and to move the cylindrical projection 72 out of engagement with the stationary probe 74. The quick disconnect member 38 is then rotated away from the helmet (not shown) and the ball 34 is disengaged from the cavity 32 in the socket member 10, completing the disconnection.

While the quick disconnect coupling has been described in connection with an aviator's helmet-mounted oxygen breathing system, it should be understood that its use is not limited thereto and that many changes and modifications in structure may be made without departing from the scope of this invention as defined by the appended claims.

We claim:

1. In a coupling device, the combination comprising a first member having one end formed with an opened cavity and a slot communicating therewith and having another end formed with an opening, a second member including movable means projecting from one end thereof into the opening of said first member, interconnecting means having one end secured to said second member and another end extending through the slot of said first member, an element fixed to the said other end of said interconnecting means and being disposed in the cavity of said first member whereby the first and second members are retained in coupled relationship, and means operatively connected to said movable means for moving the same out of the opening of said first member whereby said second member is operable to move said element out of the cavity of said first member to disconnect the first and second members.

2. A coupling comprising a pair of coupling members detachably connected together, one of said members having a seat in one end and means forming an opened cavity with an elongated slot communicating therewith in the other end, the other of said coupling members having a movable member disposed therein, means in said other coupling member urging said movable member into engagement with said seat, means having one end portion secured to said other coupling member and another end portion extending through said elongated slot, and an element removably disposed in said cavity and being fixed to the said other end portion for detachably connecting said members.

3. A coupling comprising a pair of coupling members detachably connected together, one of said members having a seat in one end and means forming a cavity with an elongated slot communicating therewith in the other end, the other of said members having a movable member disposed therein, means in said other member biasing said movable member to extend therefrom, an arm having one end portion secured to said other member and another end portion extending through said elongated slot, and an element removably disposed in said cavity and being fxed to said other end portion whereby said movable member engages said seat to retain said coupling members together.

4. The coupling of claim 3 having means forming an elongated slot in said other member, release means attached to said movable member and extending through said last named slot, said release means being operable to remove said movable member from said seat whereby said element may be removed from said cavity to detach said coupling members.

5. A coupling comprising a pair of coupling members detachably connected together, one of said members having a seat with a guide portion adjacent thereto on one end and the other of said members having a movable member disposed therein, means biasing said movable member to protrude from said other member for engagement with said guide portion and said seat, the other end of said one member having means forming a cavity with an elongated slot communicating therewith, an arm having one end portion secured to said other member and the said another end extending through said slot, and an element slidably and rotatably mounted in said cavity and fixed to said other end portion whereby said movable member is moved against the action of said biasing means by slidable engagement with said guide portion and is forced into engagement with said seat to connect said coupling members.

6. The coupling device of claim 5 having means forming an elongated slot in said other member, and means attached to said movable member and extending through said last named slot, said last named means being operable to remove said sleeve from said seat whereby said element may be removed from said cavity to detach said coupling members.

References Cited in the file of this patent

UNITED STATES PATENTS

| | | |
|---|---|---|
| 2,112,417 | Farmer | Mar. 29, 1938 |
| 2,165,504 | Pfauser | July 11, 1939 |
| 2,218,318 | Pfauser | Oct. 15, 1940 |
| 2,305,841 | Carlson | Dec. 22, 1942 |
| 2,394,236 | Eastman | Feb. 5, 1946 |